(12) United States Patent
Dankovits et al.

(10) Patent No.: US 9,380,654 B2
(45) Date of Patent: Jun. 28, 2016

(54) LIGHT EMITTING DIODE (LED) LAMP REPLACEMENT DRIVER FOR LINEAR FLUORESCENT LAMPS

(71) Applicant: General Electric Company, Schenectady, NY (US)

(72) Inventors: Peter Dankovits, Budapest (HU); Krisztian Novak, Budapest (HU); Peter Zalka, Budapest (HU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 173 days.

(21) Appl. No.: 13/939,245

(22) Filed: Jul. 11, 2013

(65) Prior Publication Data

US 2015/0015150 A1    Jan. 15, 2015

(51) Int. Cl.
*H05B 37/02*    (2006.01)
*H05B 33/08*    (2006.01)

(52) U.S. Cl.
CPC ........ *H05B 33/0809* (2013.01); *H05B 33/0803* (2013.01); *Y02B 20/386* (2013.01)

(58) Field of Classification Search
CPC .... H05B 33/0812; H05B 37/02; H05B 33/08; H05B 33/0803; H05B 33/0809; H05B 33/0815; F21K 9/17; F21K 9/175; Y02B 20/386
USPC .............. 315/200 R, 224–226, 276, 291, 307
See application file for complete search history.

(56) References Cited

U.S. PATENT DOCUMENTS

| | | | |
|---|---|---|---|
| 4,306,758 A | 12/1981 | Johnson et al. | |
| 7,097,327 B1 | 8/2006 | Barton | |
| 7,344,398 B2 | 3/2008 | Sibout | |
| 7,549,787 B1 | 6/2009 | Blaymore | |
| 8,007,300 B2 | 8/2011 | Vogt et al. | |
| 8,147,091 B2 | 4/2012 | Hsia et al. | |
| 8,618,746 B1 * | 12/2013 | Lau ................... | H05B 33/0809 315/297 |
| 9,055,636 B2 * | 6/2015 | Lee ................... | H05B 33/0815 |

(Continued)

FOREIGN PATENT DOCUMENTS

EP       2477456 A1    7/2012
WO   2010069983 A1    6/2010

(Continued)

OTHER PUBLICATIONS

"ETL-Listed T8 Fixture Replacements for LED Tube Lights", PRLOG—LEDtronics, Jul. 8, 2011.

(Continued)

*Primary Examiner* — Jimmy Vu
(74) *Attorney, Agent, or Firm* — GE Global Patent Operation; Peter T. DiMauro

(57) ABSTRACT

Provided is a driver circuit including an input port configured for coupling to a ballast and a transformer having a first side coupled to the input port. The driver circuit also includes a rectifier having an input portion coupled to a second side of the transformer and an output portion configured for coupling to a light source. The transformer is configured to match output characteristics of the ballast to input characteristics of the light source.

5 Claims, 3 Drawing Sheets

(56) References Cited

U.S. PATENT DOCUMENTS

| | | | |
|---|---|---|---|
| 2002/0060526 A1* | 5/2002 | Timmermans | F21K 9/17 315/246 |
| 2003/0102810 A1* | 6/2003 | Cross | F21K 9/17 315/74 |
| 2004/0012959 A1* | 1/2004 | Robertson | F21K 9/17 362/247 |
| 2005/0153590 A1 | 7/2005 | McCauley | |
| 2005/0281030 A1* | 12/2005 | Leong | F21K 9/00 362/234 |
| 2010/0103673 A1* | 4/2010 | Ivey | B29C 39/10 362/249.02 |
| 2012/0043892 A1* | 2/2012 | Visser | F21V 25/04 315/121 |
| 2012/0147598 A1* | 6/2012 | Ivey | F21K 9/17 362/223 |
| 2012/0161666 A1* | 6/2012 | Antony | H05B 33/0809 315/294 |
| 2014/0084799 A1 | 3/2014 | Lee | |

FOREIGN PATENT DOCUMENTS

| | | | | |
|---|---|---|---|---|
| WO | WO2010069983 | * | 6/2010 | F21V 25/04 |
| WO | 2010106375 A2 | | 9/2010 | |
| WO | WO2010016375 | * | 9/2010 | H05B 33/08 |
| WO | 2012114097 A2 | | 8/2012 | |

OTHER PUBLICATIONS

"LED T8 4-ft Tube Open Commercial Light Fixture", energy now, Product Catalog.

"Aleddra "Double-Safety Switch" Linear LED Tube CRI 80+", Lightel Technologies Inc., Product Catalog.

PCT Search Report and Written Opinion issued in connection with corresponding WO Application PCT/US2014/045841 dated Sep. 24, 2014.

* cited by examiner

LIGHT EMITTING DIODE (LED) LAMP REPLACEMENT DRIVER FOR LINEAR FLUORESCENT LAMPS

I. FIELD OF THE INVENTION

The present invention relates generally to replacement solutions for LED lamps. More particularly, the present invention relates to LED replacement drivers for electronic ballasts in linear fluorescent lamps (LFLs).

II. BACKGROUND OF THE INVENTION

In the field of electrical lighting, many different types of light sources have been developed over the years. Recently, fluorescent light fixtures have been developed to take advantage of the greater electrical efficiency provided by such lights.

To prevent self-destruction, conventional fluorescent lamps must use a ballast to regulate the current flow through the lamp's glass tubes. However, when the ballasts and other components break down and require replacement, repair of the fluorescent light can be costly in terms of both parts and labor. Also, disposal of fluorescent lamps raises environmental issues because of their mercury content.

To address the problems associated with fluorescent lamps, LED lamps are now widely accepted as a more efficient and environmental friendly light source than fluorescent lamps. LED lamps allow electrical current to pass through the device in one direction while blocking current flow in the opposite direction. LED lamps provide many advantages as a lighting alternative compared to fluorescent lamps. Some benefits of using LED lamps include no mercury, operation in extreme cold conditions, longer life, and better energy efficiency.

To satisfy the required UL 1598C standards and to leverage the benefits of the fluorescent lights, most lighting manufacturers produce retrofit kits to install LED components in existing light fixtures. However, many of these kits require modification to the existing fixtures, and some still potentially create the risk of fire and shock. Often, highly trained technicians are required to perform these modifications. Thus, retrofitting and rewiring existing fluorescent fixtures can be quite expensive and dangerous. Some manufacturers produce safety switches to protect against the risk of shock.

In addition to addressing the risk of shock, efforts have been made by lighting manufacturers to provide a LED lamp that is simple enough for ordinary consumers to replace. Another problem associated with replacing fluorescent lamps is that each type of fluorescent lamp is designed with different electronic ballasts to properly start and operate the lamp.

Many of the existing replacement solutions, for example, work only with switch start magnetic ballasts. The switch start magnetic ballast replacement LED replacement solution, however, requires fixture modification, as will be described in further detail below. Many of the geographic territories in which these approaches are most needed do not permit fixture modifications.

By way of background, there are hundreds of different types of fluorescent lamps including different types of ballasts available on the market, which requires ballast manufacturers to carry an expansive inventory of ballast types. The most common electromagnetic ballasts are switch start (preheat), rapid start, program start, and instant start.

A switch start (preheat) electromagnetic ballast uses a combination filament-cathode at each end of the lamp in conjunction with a starter switch that initially connects the filaments in series with the ballast, thereby preheating the filaments prior to striking an arc tube. The starter switch closes, permitting a heating current to flow through each electrode. The starter switch triggers the supply voltage to be applied across the arc tube to initiate the discharge. The electrode heating power is turned off after the lamp discharge is initiated.

A rapid start electronic ballast uses filament power windings within the ballast to provide a low voltage to the lamp prior to lamp ignition. The ballast applies voltage and heats the cathode simultaneously. The rapid start electronic ballast continues to heat the lamp electrodes even after the lamp is started.

Program start electronic ballasts include circuitry to preheat the lamp filaments to apply cathode heat before lamp ignition, and then remove it once the lamp is ignited. The ballast applies power to the filaments first, then after a short delay to allow the cathodes to preheat, applies voltage to the lamps to strike an arc.

Instant start electronic ballasts do use filaments to provide ignition. The ballasts of these tubes do not preheat the electrodes. Rather, they use a high voltage to break down the gas and mercury column to initiate the discharge arc. These tubes can be identified by a single pin at each end of the tube or a shunted lamp holder.

None of the above-described electronic ballasts have a robust, straightforward solution for enabling the design of LFL replacement LED lamps. Although limited solutions exist, each of these approaches requires some level of modification of the lamp's fixture. In the absence of such a solution, the market for LFL replacement LEDs will remain limited.

III. SUMMARY OF EMBODIMENTS OF THE INVENTION

Given the aforementioned deficiencies, a need exists for methods and systems for a universal, low-cost solution for LFL LED replacement lamps. More particularly, a need exists for methods and systems for LFL LED replacement lamp drivers for electronic ballasts that eliminate the need for significant fixture modification.

Embodiments of the present invention provide a replacement driver circuit. The driver circuit includes an input port configured for coupling to a ballast and a transformer having a first side coupled to the input port. The driver circuit also includes a rectifier having an input portion coupled to a second side of the transformer and an output portion configured for coupling to a light source. The transformer is configured to match output characteristics of the ballast to input characteristics of the light source.

As noted above, the illustrious embodiments of the present invention provide a low-cost driver solution for LFL LED replacement lamps for electronic ballasts that eliminate the need for significant modification to the lamp's fixture. The embodiments enable the design of LFL replacement LED lamps, particularly those with rapid start, and program start ballasts, extending the market niche for LFL replacement solutions.

Aspects of the illustrious embodiments are also particularly well-suited for use with series connected LFL tubes (e.g. 2 ft. LFL tubes used in four tube office fixtures). The series connected fixtures are commonly used in office buildings throughout the world.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

IV. BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention. The embodiments of the present invention are illustrated in the accompanying drawings, through which, like reference numerals may indicate corresponding or similar parts in the various figures.

The drawings are only for purposes of illustrating preferred embodiments and are not to be construed as limiting the disclosure. Given the following enabling description of the drawings, the novel aspects of the present invention should become evident to a person of ordinary skill in the art.

V. DETAILED DESCRIPTION OF VARIOUS EMBODIMENTS

The following detailed description is merely exemplary in nature and is not intended to limit the applications and uses disclosed herein. Further, there is no intention to be bound by any theory presented in the preceding background or summary or the following detailed description. While embodiments of the present technology are described herein primarily in connection with fluorescent lighting fixture, the concepts are also applicable to other types of mounted lighting fixtures.

Figure 1:
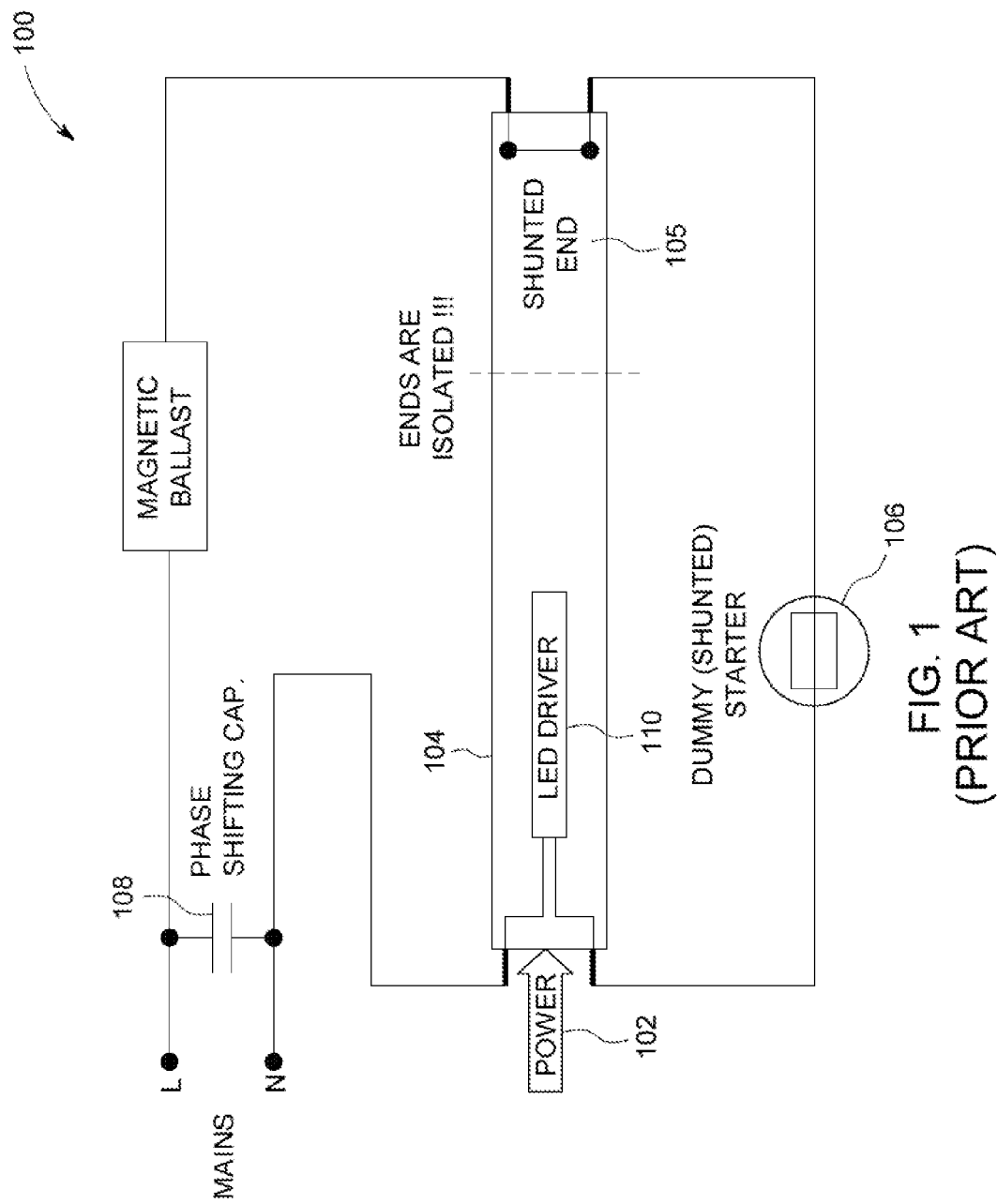
FIG. 1 is a block diagram illustration of a LED replacement solution in a conventional magnetic ballast application.
Figure 2:
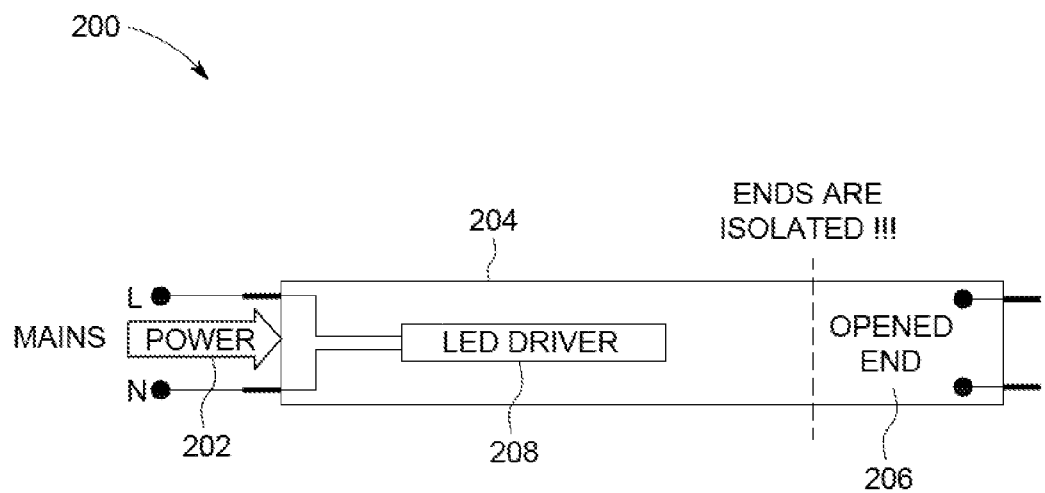
FIG. 2 is a block diagram illustration of another LED replacement solution in a conventional magnetic ballast application.

By way of background, FIGS. 1-2 are conventional implementations of LFL LED replacement circuits. FIG. 1, for example, is a block diagram illustration of an LFL LED replacement circuit 100 for a conventional magnetic ballast application. More particularly, the circuit 100 is a physical solution for replacement of an LFL LED, such as a T8 tube.

In the circuit 100, a single-ended power supply input 102, at one end of an LED tube 104, provides power for the circuit 100. An opposite end 105 of the tube 104 is shunted. There is also use of a shunted or a dummy starter 106 that shorts the circuit 100. Also included is a phase shifting capacitor 108. An LED driver 110 regulates driving current to LEDs (not shown) connected to the LED driver 110. Generally, LED drivers, such as the LED driver 110, have output characteristics that are matched to the desired output performance parameters of their associated LEDs.

The circuit 100, however, requires a new user to modify the lamps fixture before it can be used. In particular, the starter (not shown) must be replaced. The circuit 100 is primarily used with magnetic/switch start ballasts. Additionally, the circuit 100 can be used only in conventional electromagnetic switch start applications. Given this limited applicability, the circuit 100 is useful in only a small portion of the LFL LED replacement market.

FIG. 2 is a block diagram illustration of another LFL LED replacement circuit 200 that can be used for conventional magnetic ballast applications. The replacement circuit 200 also includes a single double-ended power supply input 202 at one end of an LED tube 204. In the LED replacement circuit 200, an opposite end 206 is open. An LED driver 208 performs power regulation and parameter matching.

The LED replacement circuit 200, however, requires significant rewiring prior to use. Such rewiring cannot easily and safely be performed by a typical user, and usually requires an experienced electrician to perform the replacement. Additionally, the electrical regulations of many countries restrict the use of this type circuit, thereby limiting its applicability primarily to U.S. markets.

Referring back to FIG. 1, the LFL LED replacement circuits 100 and 200 are both generally configured for use with double-ended power supplies. Doubling the power supplies, however, is generally considered unsafe. This safety risk is attributable to the possibility of a shock during replacement.

Figure 3:
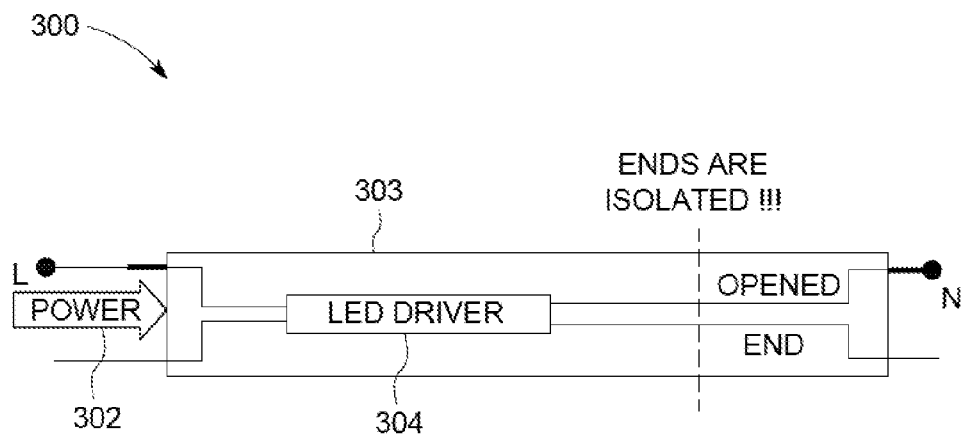
FIG. 3 is a block diagram illustration of a LED replacement solution constructed and arranged in accordance with an embodiment of the present invention.

FIG. 3 is a block diagram illustration of a LED replacement circuit 300 constructed in accordance with an embodiment of the present invention. The circuit 300 works with electronic ballasts and leverages the current limiting capability of existing ballast fixtures. Additionally, the circuit 300 does not require the user, or other person, to modify the lamps fixture prior to use. Additionally, the circuit 300 is a double-ended power input configuration included tubes for connection serially. This type fixture is widely used in offices, for example, in 2×2 foot fixtures and a variety of other existing off-the-shelf lamp fixtures.

The circuit 300 includes a first input terminal 302 to receive power from an output terminal of a power supply (e.g., an electronic ballast output) to activate an LFL tube 303. Also included is a second input terminal 304 configured for connection to another power supply. An LED driver 305 performs power regulation and parameter matching between a ballast output and the input parameters required to drive a lighting source, such as LEDs.

In the exemplary circuit 300, power flows to the LED driver 305 via the first terminal 302 and the second terminal 304. In the embodiments, a single transformer is used to adjust the power to the LEDs.

Figure 4:
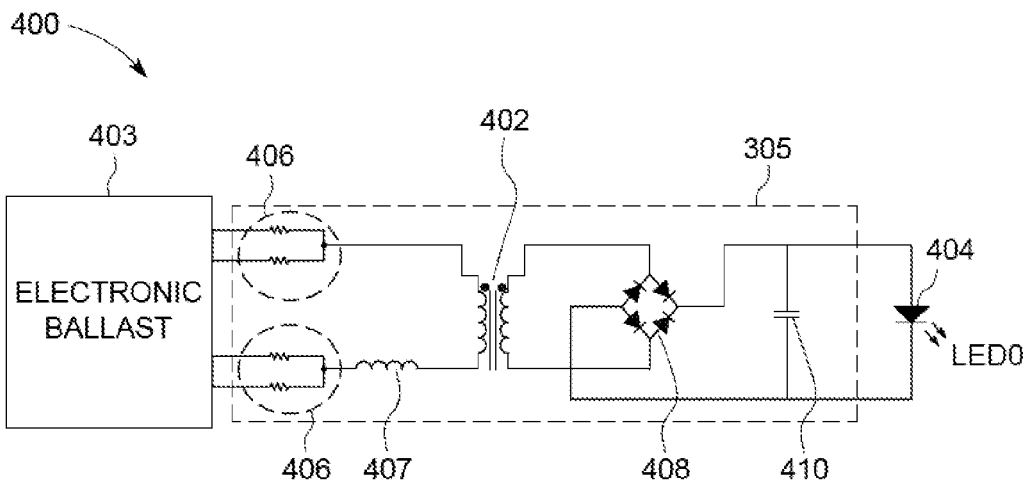
FIG. 4 is a schematic diagram illustration of the LED driver in the circuit of FIG. 3 constructed and arranged in accordance with the embodiments.

FIG. 4 is a detailed schematic diagram illustration of an exemplary driver circuit 400. The driver circuit 400 includes a more detailed illustration of the LED driver 305, in the LFL tube 303 of FIG. 3. As explained in greater detail below, the driver circuit 400 uses a single transformer 402 to match output characteristics of an electronic ballast 403 to parameters required operate an LED array 404.

By way of example, the driver circuit 400 can be used with serially connected LFL tubes, such as two foot LFL tubes at are commonly used in four tube office fixtures. Resistors 406 form an input port for the driver circuit 400 and receive an alternating current (AC) voltage output from the electronic ballast 403. An inductor 407 limits current and provides other adjustments necessary for the AC voltage before passing to the transformer 402. The transformer 402 reduces the AC voltage received from the ballast 403 to a level ultimately suitable for use as a power source for the LED array 404.

In the exemplary driver circuit 400, a rectifier 408 converts the AC voltage from the ballast 403 into a direct current (DC) voltage for input into the LED array 404. In the driver circuit 400, the rectifier 408 permits the voltage flowing therethrough to flow in only one direction along a circuit path to the LEDs. The rectifier 408 can be implemented as a diode bridge, or some other suitable component. In the exemplary driver circuit 400, a capacitor 410 enhances performance of the LED array 404 by filtering out spikes and smoothing for the DC voltage that drives the LEDs.

Although the exemplary driver circuit 400 includes specific components, the driver circuit 400 is merely one approach of matching output characteristics of an electronic ballast, such as the ballast 403, to parameters required to operate an LED array, such as the LED array 404. Other approaches would be readily apparent to one of skill in the art and would be within the spirit and scope of the present invention.

In the illustrious embodiment of FIG. 4, the exemplary driver circuit 400 is used for matching and separating the input to the LED array 404 from and to the output from the ballast 403. In another embodiment, a single transformer could separate and completely isolate the two sides of the driver circuit (the ballast output in the LED input) between the ballast and the LED array.

In yet another embodiment, one transformer can be used to perform the separating function while the matching of the parameters could be achieved using modulation techniques, such as pulse code modulation (PCM), pulse width modulation (PWM), and frequency modulation.

Figure 5:
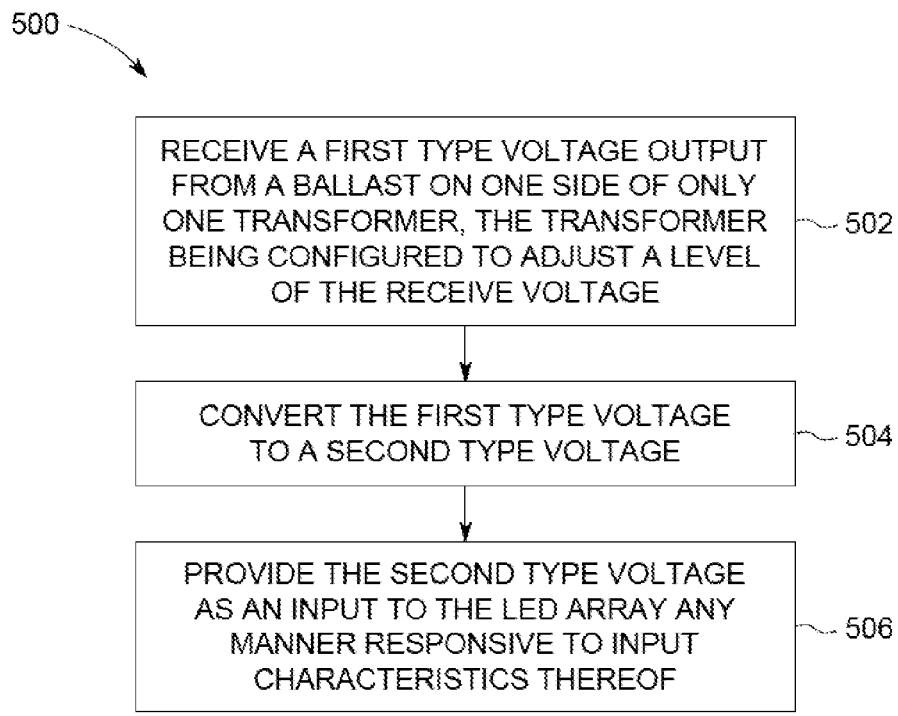
FIG. 5 is a flowchart of an exemplary method of practicing an embodiment of the present invention.

FIG. 5 is a flowchart of an exemplary method 500 of practicing an embodiment of the present invention. In a step 502 a first type voltage is received as an output from a ballast on one side of only one transformer, the transformer being configured to adjust a level of the receive voltage. In step 504, the first type voltage is converted to a second type voltage. In step 506, the second type voltage is provided as an input to the LED array any manner responsive to input characteristics thereof.

Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

The invention claimed is:

1. An LED replacement driver circuit, comprising:
    a first input port comprising first resistors operably connected to a first output of a ballast;
    a second input port comprising second resistors operably connected to a second output of the ballast;
    a single transformer having a first side coupled to the first input port and to the second input port; and
    a rectifier having an input portion coupled to a second side of the transformer and an output portion operably coupled to an LED light source;
    wherein the transformer matches output characteristics of the ballast to input parameters of the LED light source.

2. The circuit of claim 1, further comprising an inductor having an input connected to the second input port and an output connected to the transformer.

3. The circuit of claim 1, wherein the ballast is electronic.

4. The circuit of claim 1, further comprising a capacitor connected across the output of the rectifier and an input of the LED light source.

5. The circuit of claim 1, wherein the LED light source is an LED array.

* * * * *